United States Patent
Cozza et al.

[11] Patent Number: 6,095,537
[45] Date of Patent: Aug. 1, 2000

[54] UNIVERSAL DISPLAY CASE DOLLY

[76] Inventors: Frank Charles Cozza; Arthur Vincent Harris, both of 4918 N. Harbor Dr. Ste. 104, San Diego, Calif. 92106

[21] Appl. No.: 09/119,010

[22] Filed: Jul. 20, 1998

[51] Int. Cl.[7] .................................................... B62B 3/04
[52] U.S. Cl. .................................. 280/79.11; 280/47.34; 280/47.35; 414/458
[58] Field of Search ................... 280/33.991, 33.997, 280/33.998, 87.01, 47.131, 47.34, 47.35, 79.11, 79.3, 79.6, 77.7; 16/18 R, 22, 30, 43; 414/444, 446, 458

[56] References Cited

U.S. PATENT DOCUMENTS

| | | | |
|---|---|---|---|
| 528,939 | 11/1894 | Grabill | 280/47.131 |
| 2,347,524 | 4/1944 | Swan | 16/43 |
| 2,550,219 | 4/1951 | Bollinger | 280/47.131 |
| 3,404,425 | 10/1968 | Wilder | 280/79.3 |
| 4,098,518 | 7/1978 | Minkoff | 280/47.131 |
| 4,699,391 | 10/1987 | Syring | 280/79.11 |
| 4,700,430 | 10/1987 | Raferty | 16/18 R |
| 4,921,264 | 5/1990 | Duffy | 280/47.34 |
| 5,524,322 | 6/1996 | Muehlen | 280/79.11 |
| 5,782,600 | 7/1998 | Walsh | 414/458 |
| 5,823,549 | 10/1998 | Morgan, Jr. | 280/33.998 |
| 5,927,731 | 7/1999 | Clarke | 280/79.7 |

FOREIGN PATENT DOCUMENTS

| | | | |
|---|---|---|---|
| 677589 | 8/1952 | United Kingdom | 280/47.131 |
| 2242870 | 10/1991 | United Kingdom | 280/47.131 |

*Primary Examiner*—J. J. Swann
*Assistant Examiner*—F. B. Vanaman
*Attorney, Agent, or Firm*—Frank D. Gilliam

[57] ABSTRACT

A dolly system for use in moving large, loaded, display cases and similar structures that includes several dollies and apparatus for lifting the cases onto the dollies. Each dolly includes a housing having typically four casters on one side with walls around each caster and spaced tapered walls along a surface for supporting a downwardly extending rail along the underside of the case. A surface for engaging and supporting a kick plate is included, with a ridge for retaining the kick plate in position. An extendable bar is positioned through holes in the rails so that the case may be lifted with a fork lift and the dollies placed in position. The dollies may also be fastened to a large sheet of plywood or to a wood gondola for supporting other types of cases. With this system, during store renovation fully loaded display cases may be moved as needed and can be used by customers while mounted on the casters.

23 Claims, 6 Drawing Sheets

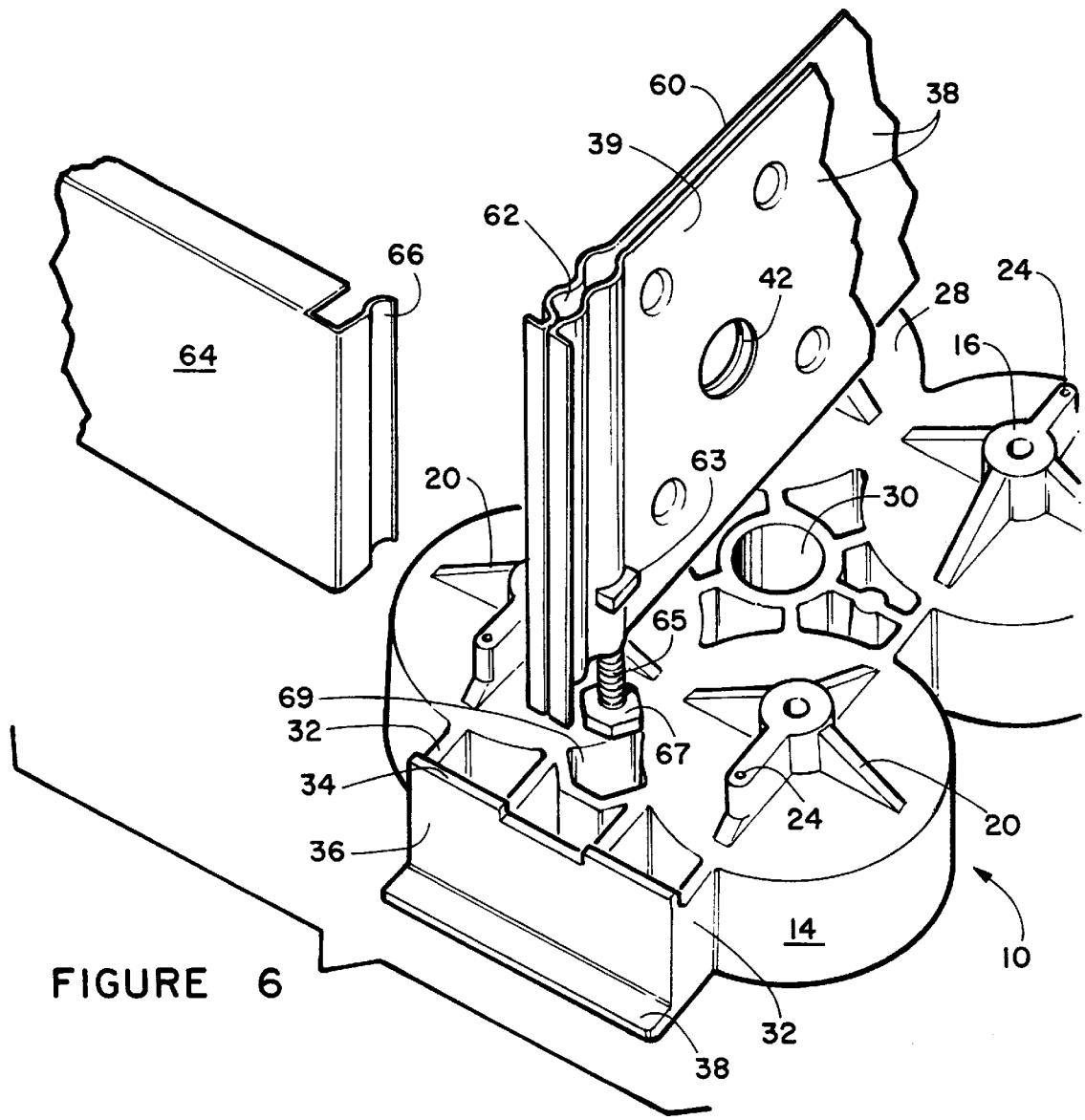
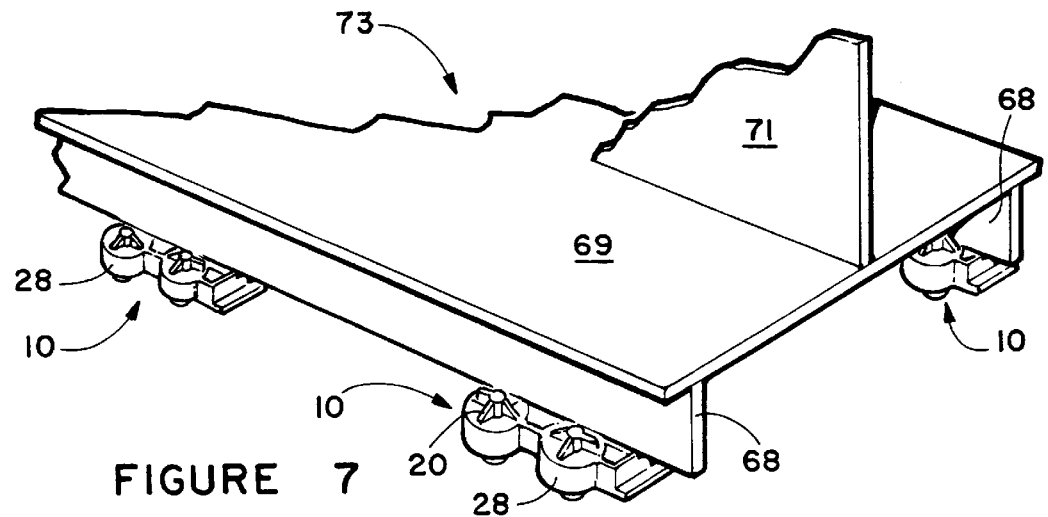

UNIVERSAL DISPLAY CASE DOLLY

FIELD OF THE INVENTION

This invention relates to dollies for moving large structures such as retail store display cases.

BACKGROUND OF THE INVENTION

A variety of different dollies for moving large objects, such as furniture, trash containers, file boxes and the like have been developed over the years. Generally, such dollies have a flat platform mounted on swiveling casters and an extended handle for pulling the dolly while moving heavy objects.

Typical of such dollies are the refuse container dolly described by Delmerico et al. In U.S. Pat. No. 5,074,572, the transport cart disclosed by Mitchell et al. In U.S. Pat. No. 4,203,609, the oxygen tank cart disclosed by Frazier in U.S. Pat. No. Des. 302,063, the platform hand truck described by Lamson in U.S. Pat. No. 4,458,906 and the variable size cart shown by McCoy et al. In U.S. Pat. No. 5,249,823.

While these and other prior dollies have been effective for moving structures having a generally flat bottom suitable for placement on a generally flat dolly surface, there are specialized moving needs not met by those dollies.

In remodeling or renovation of retail stores such as grocery stores, drug stores and the like it is often necessary to move large display cases from one part of the store to another. The cases are large, heavy and have shelves carrying a very large number of small products for sale. Removing and replacing the products each time the display case is moved is time and labor intensive. The ability to move display cases while fully loaded with products is highly desirable.

In some instances, loaded display cases can be roved with any suitable lifting apparatus, such as conventional fork lifts or floor jacks and placing them on conventional flat surfaced dollies. However, most display cases are too long, or are connected together in long sets, for movement by those means. Often, there is not room between adjacent display cases for entry of a fork lift or large flat surfaced dolly.

Attempts have been made to use a large number of small, individual casters on brackets to be fastened to display cases. The display case is lifted and the casters are bolted along edges. These casters have been found to be easily bent or otherwise damaged during display case movement and require special fixtures on the display case to which the casters are fastened, so that the casters are not adaptable to a variety of display case structural designs.

Thus, there is a continuing need for improved devices or dollies for allowing easy, quick and safe movement of large display cases loaded with products and other similar products. The dollies must be strong, inexpensive and easy to use. They must be adaptable to a variety of different structural designs and be capable of providing support against tilting or shaking during movement.

SUMMARY OF THE INVENTION

The above-noted problems, and others, are overcome by a dolly system for lifting and moving loaded display cases and similar structures. The system includes a plurality of dollies, each of which basically comprises a housing having upper and lower sides, a plurality of casters mounted on the lower side of said housing and a wall around each caster with each caster extending a predetermined distance beyond the respective wall. The upper side of said housing including means for engaging a rail extending downwardly from a display case or the like for supporting the display case. The rails may typically be a wood or metal panel, a multi-part panel assembled from formed sheet metal, etc.

Preferably, the upper side of the housing also includes means for engaging a kick plate on a display case to be supported. One side of said housing preferably includes means for engaging and fastening to an elongated plank for fastening adjacent dollies together. Attachment means may also be provided on the housing upper surface for fastening to a large sheet of material. Typically these attachment means maybe secured to a plywood sheet by screws through pre-formed holes in the dolly.

The casters preferably are fully swiveling and may have one or two wheels with each caster, sized in accordance with the load to be supported. Generally, single wheel casters formed from a plastic material that will not mar the floor covering are effective. Where a very heavy load is to be moved a dual wheel caster is preferred, which the load over a larger wheel/floor contact surface to prevent marring the floor. While the dolly may be formed from any suitable material, glass fiber filled acrylonitrile-butadiene-styrene (ABS) plastics provide an optimum combination of strength, light weight and formability.

BRIEF DESCRIPTION OF THE DRAWING

Details of the invention, and of preferred embodiments thereof, will be further understood upon reference to the drawing, wherein:

FIG. 6 is a perspective view showing a portion of a display case supported on the dolly of FIG. 1;

FIG. 7 is a perspective view of one type of display support gondola on the dolly of FIG. 1;

DETAILED DESCRIPTION OF PREFERRED EMBODIMENTS

Figure 1:
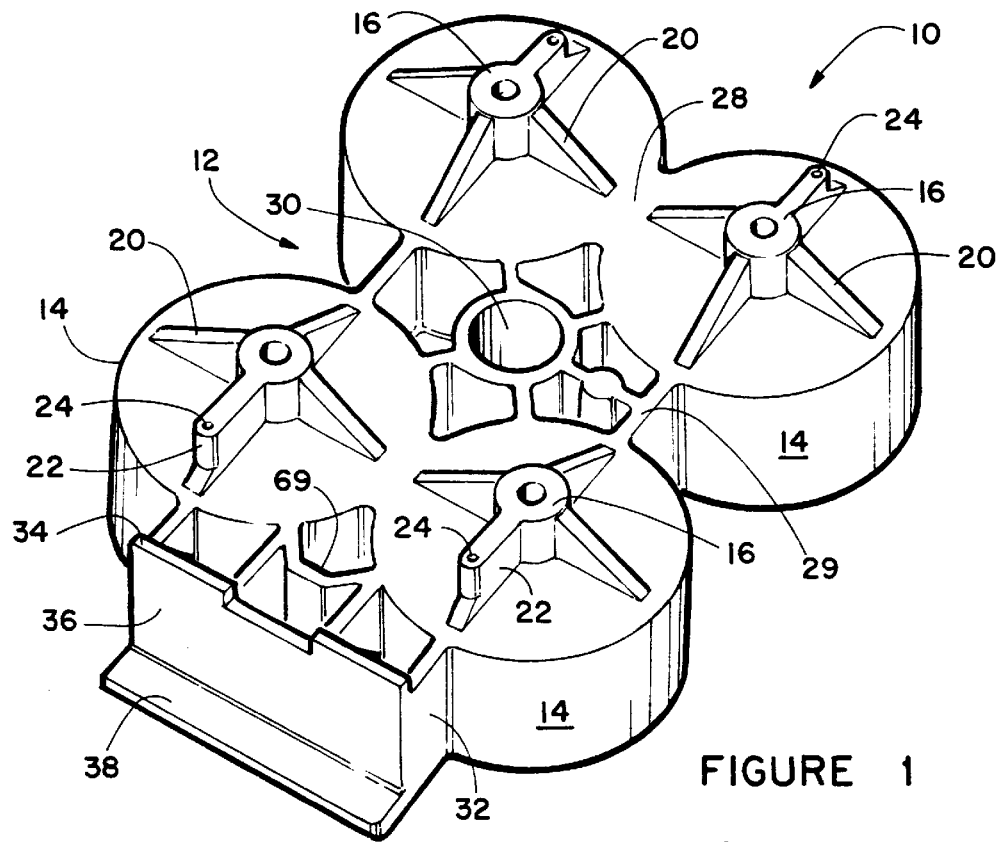
FIG. 1 is a front top perspective view of the dolly of this invention.
Figure 2:
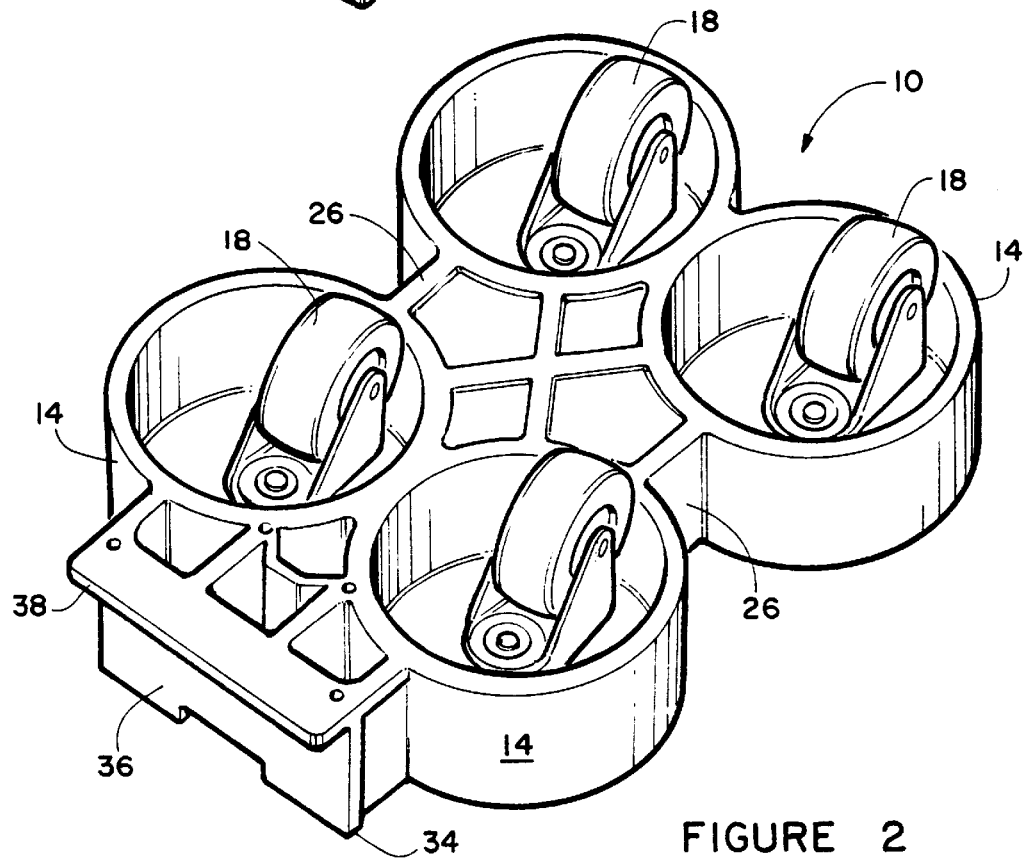
FIG. 2 is a perspective view of the underside of the dolly of FIG. 1.

Referring to FIGS. 1 and 2, top and bottom view, respectively, are seen of the dolly 10 of this invention. A housing 12 includes four generally circular walls forming pockets 14 extending downwardly. A central tube 16 extending from the center of the base of each pocket 14 houses a caster 18 in a conventional manner. Tapered reinforcing webs 20 are preferably provided on the top surface to strengthen tubes 16. Webs on adjacent tubes 16 that extend toward each other can also act as supports for display case rails, as detailed below.

Preferably at least one reinforcement on each pocket 14 has an upper surface 22 lying in a plane and a hole 24 therethrough. A display case having a flat bottom, or a flat panel of plywood, can be fastened to the dolly by conventional screws and bolts extending upwardly through holes 24.

Webs 26 having upper surfaces of selected width are provided between two adjacent pairs of pockets 14 to support a downwardly extending rail on a display case, as detailed below. Pockets 14 are preferably molded together along sides transverse to webs 26 for maximum strength with a space 28 or selected width between reinforcements 20. When a support rail is lowered onto a dolly 10, if the dolly is slightly misaligned, the rail will contact the tapered reinforcement 20 and force the dolly to the side so that the rail slides down the taper into contact with web 26 or space 28

Some display cases may be mounted on round legs. Therefore, a central socket 30 is preferably provided for receiving and supporting such legs. Socket 30 may be configured to accept any other type of leg.

Many display cases are mounted on downwardly extending rails 39 transverse to a long side of the case. Kick plates 64 are provided along the ends of the rails to provide a finished look below the display. In that case, dolly 10 engages the lower edge of the rails on spaces 28, with the kick plate 64 lying along the upper surface of webs 32. A ridge 34 is preferably provided along the upper surface of webs 32 to hold the kick plate in place, as further described below. Since the kick plate 64 is secured to rails 39, by retaining kick plate 64 between ridge 34 and the balance of dolly 10, the kick plate 64 will be prevented from sliding off of rail 39 while the display case is being moved. With some types of display cases, for proper fit ridge 34 may be eliminated or cut away.

In some circumstances, such as with very long display cases, it may be desirable to tie adjacent dollies together. A flat front surface 36 is provided to be engaged by a conventional 1 inch by 4 inch board or the like. The lower edge of the board is supported by a ledge 38 extending outwardly of front surface 36. Conventional wood screws or the like may be threaded through the board and into front surface 36 to releasably hold the board in place. With very heavily loaded gondolas, additional braces for transferring lateral loads that may occur during moving of the entire gondola unit may be provided as desired.

Figure 3:
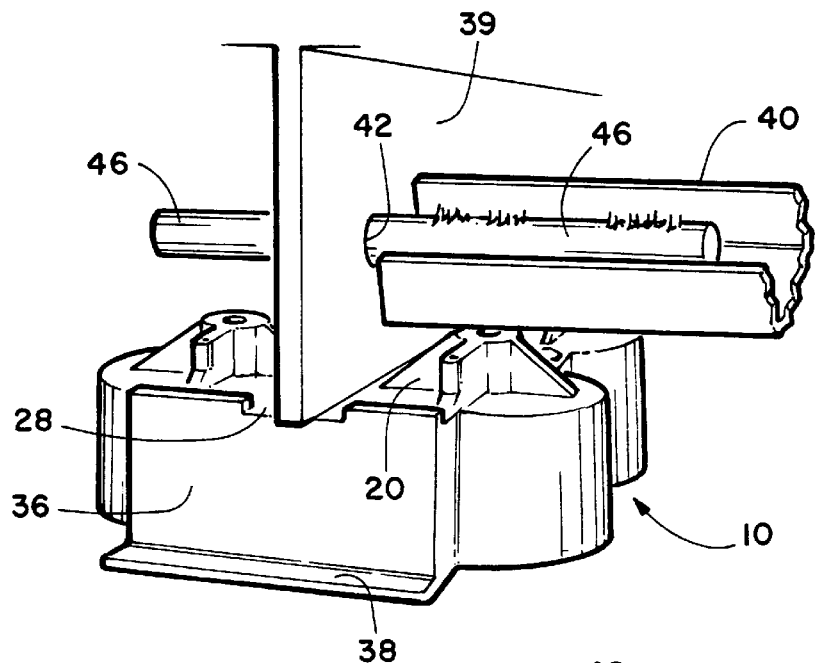
FIG. 3 is a perspective view showing the dolly in place under a display case.

FIG. 3 shows dolly 10 in place under a display case rail 39. Rail 39 rests on surface 28 between tapered reinforcements 20.

Figure 4:
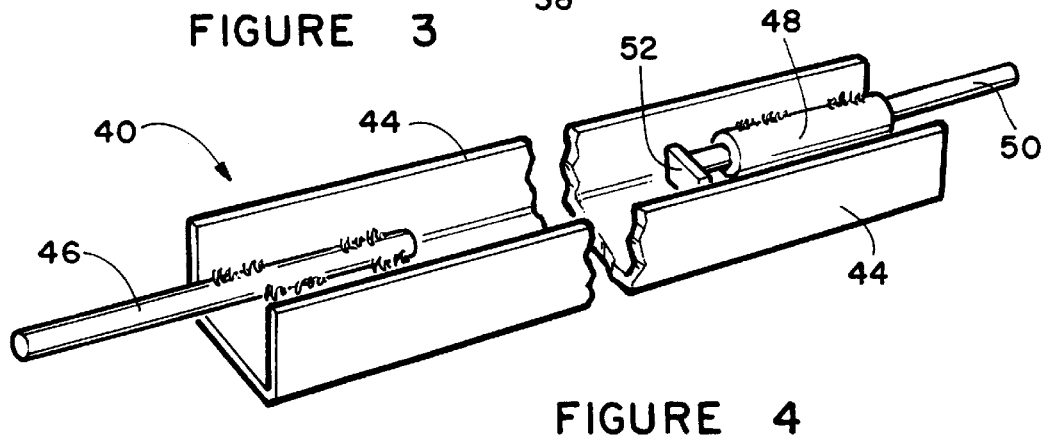
FIG. 4 is a perspective view of first embodiment of a display case lift support assembly.
Figure 5:
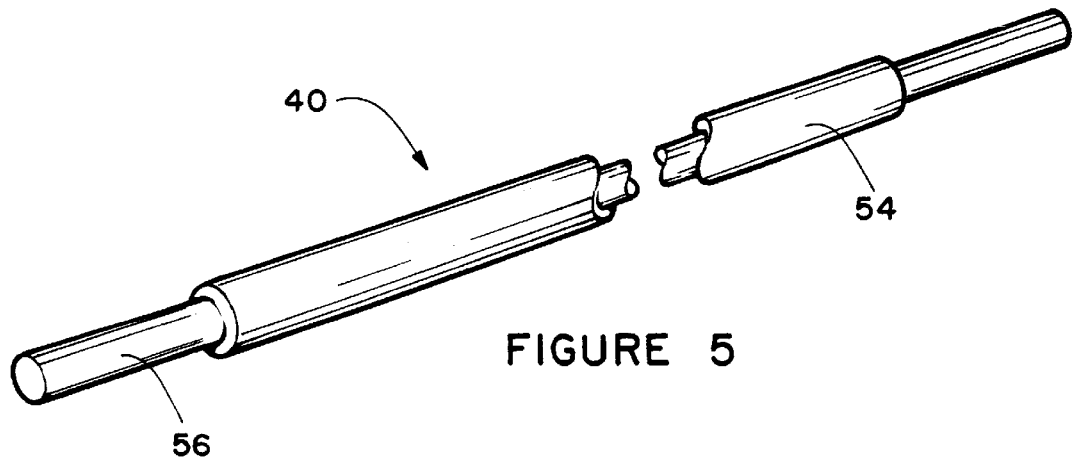
FIG. 5 is a perspective view of second embodiment of a display case lift support assembly.
Figure 12:
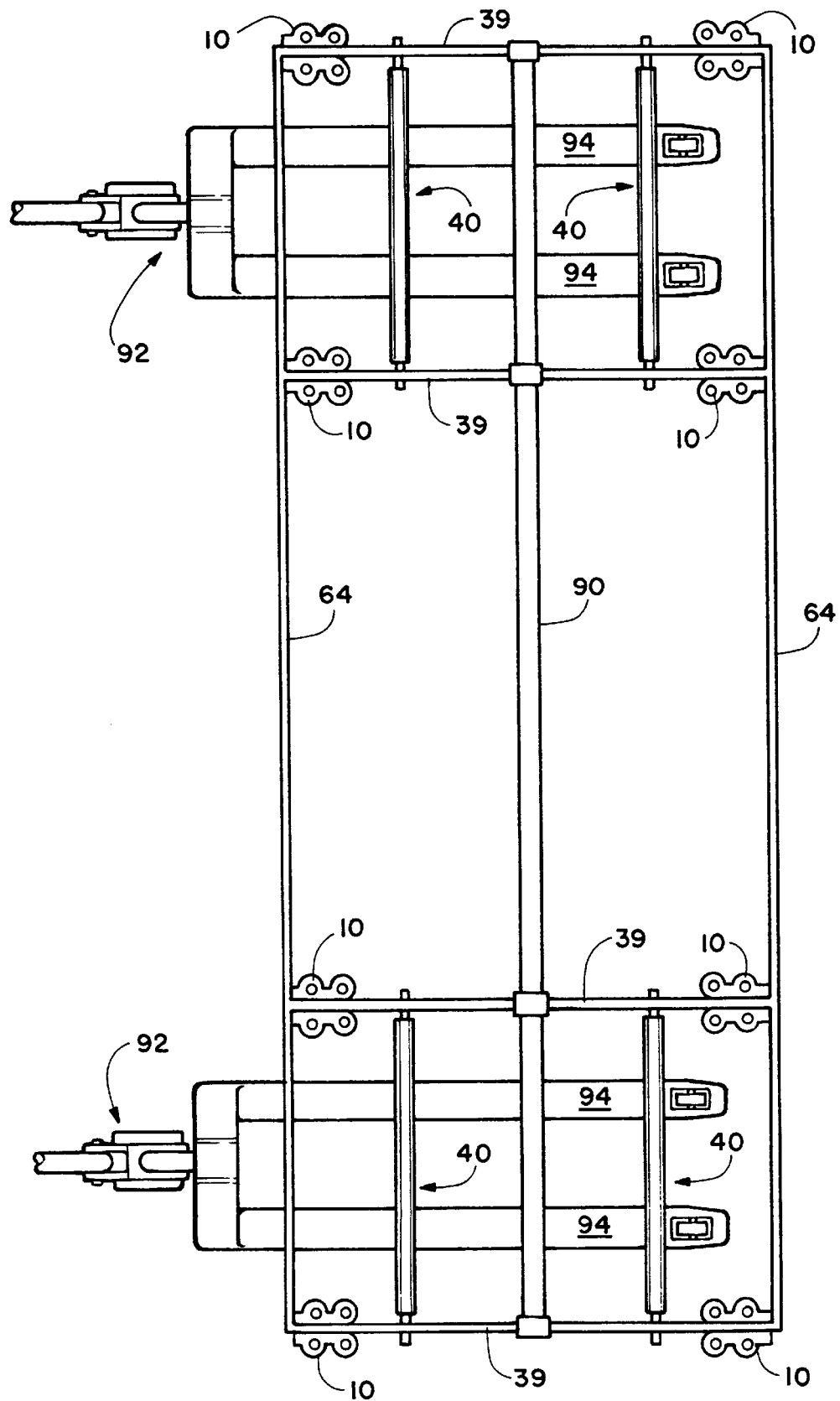
FIG. 12 is a plan view of a display understructure with lifting jacks engaging understructure lift devices.

In order to lift the display case sufficiently above the floor to allow the dollies 10 to be placed under rails 39, a lift device 40 is inserted through holes 42 in rails 39. Lift device 40 has a telescoping end, as seen in FIGS. 4 and 5, so that one, fixed end can be inserted in a hole 42 in one rail 39, then the other end extended into the hole in the opposite rail. Lifting devices 40 are engaged by a pallet jack or other suitable lifting device, as shown in FIG. 12. Typically, a pallet jack may have a powered lift means similar to a fork lift or may simply consist of a lever pivoted at a wheel.

FIG. 4 shows one embodiment of a lifting device 40. Here, a conventional steel channel member 44 has a rod 46 extending from one end of the channel member and welded thereto. A tube 48 is welded in channel member 44 adjacent to the other channel end. A rod 50 is slidably mounted in tube 48, with a transverse projection 52 at the rod proximal end to aid in pushing the rod distal end into a hole 42 and to prevent the rod from being pushed entirely out of tube 48. The length of lifting device 40, with rod 50 fully retracted, is slightly less than the distance between adjacent rails 39 in the display case to be lifted.

A second embodiment of lifting device 40 is shown in FIG. 5. Here, a tube 54 of high strength material, such as steel pipe, has an axially movable rod 56 in one end and a fixed rod 56 inserted through most of the length, up to the retracted position of rod 56, to reinforce the tube. Rod 56 can easily be slid through tube 54 so that rod 56 can be inserted into hole 42 in rail 39. The length of tube 54 is slightly less than the distance between adjacent rails 39 in the display case to be lifted. Tube 54 adds strength to rod 56 for lifting of gondolas.

FIG. 6 is a perspective detail view, showing a portion of a conventional display case understructure in engagement with dolly 10. Rails 39, which lie transverse to the front of the display case (not shown), in this embodiment, comprise two formed metal sheets fastened to together and having edges 60 for supporting the underside of a display case. The front edges of the metal sheets are formed to provide a channel 62. Kick plates 64 are supported on webs 32 and held in place by ridge 34 in most cases. With some types of gondolas, ridge 34 may be Eliminated. The kick plates have edges 66 formed to slide into channel 62.

A lifting rod or bolt 65 having a downwardly extending head 67 is threaded into a nut 63 in a slot in the lower and of channel 62. When the display case is on a floor, bolt 65 acts as a level adjustment for the case with head 67 engaging the floor. Bolt 65 is extended when the display case is mounted on dollies 10. A socket 69 in the upper surface of the dollies is sized to receive bolt head 67. This arrangement further prevents movement of a dolly 10 along rail 39 as the display case is moved on the dollies.

A plurality of dollies 10 will engage spaced rails 39. The heavy display case is thus firmly held to the dolly for smooth movement of the assembly across a floor while displayed articles remain on case shelves.

In some cases, the underside of a display case does not include suitable rails 39 for engaging dolly 10. In that case a gondola 73 having sides but no upper or lower surface may be constructed from plywood or the like to support the display case. Where a gondola having a lower plywood sheet fastened to rails 39 is used, the plywood sheet can be fastened to dollies 10 by screws through the plywood into holes 24 in the dolly, as described above. The gondola 73 is secured under the display case and the assembly is lifted in placed on dollies 10. As seen in FIG. 7, gondola 73 made up of walls 68 and a platform 69, with any desired structure 71 on platform 69 may be supported with the walls 68 engaging either surfaces 28 or the upper surface of webs 20 (as seen in FIG. 1), depending on the thickness of the gondola walls. As seen in FIG. 7, walls 68 are supported on surface 28 (as most clearly shown in FIG. 1). If desired, dollies 10 could be rotated 90° so that walls 68 would rest on the surfaces 29 of ribs 29.

Figure 8:
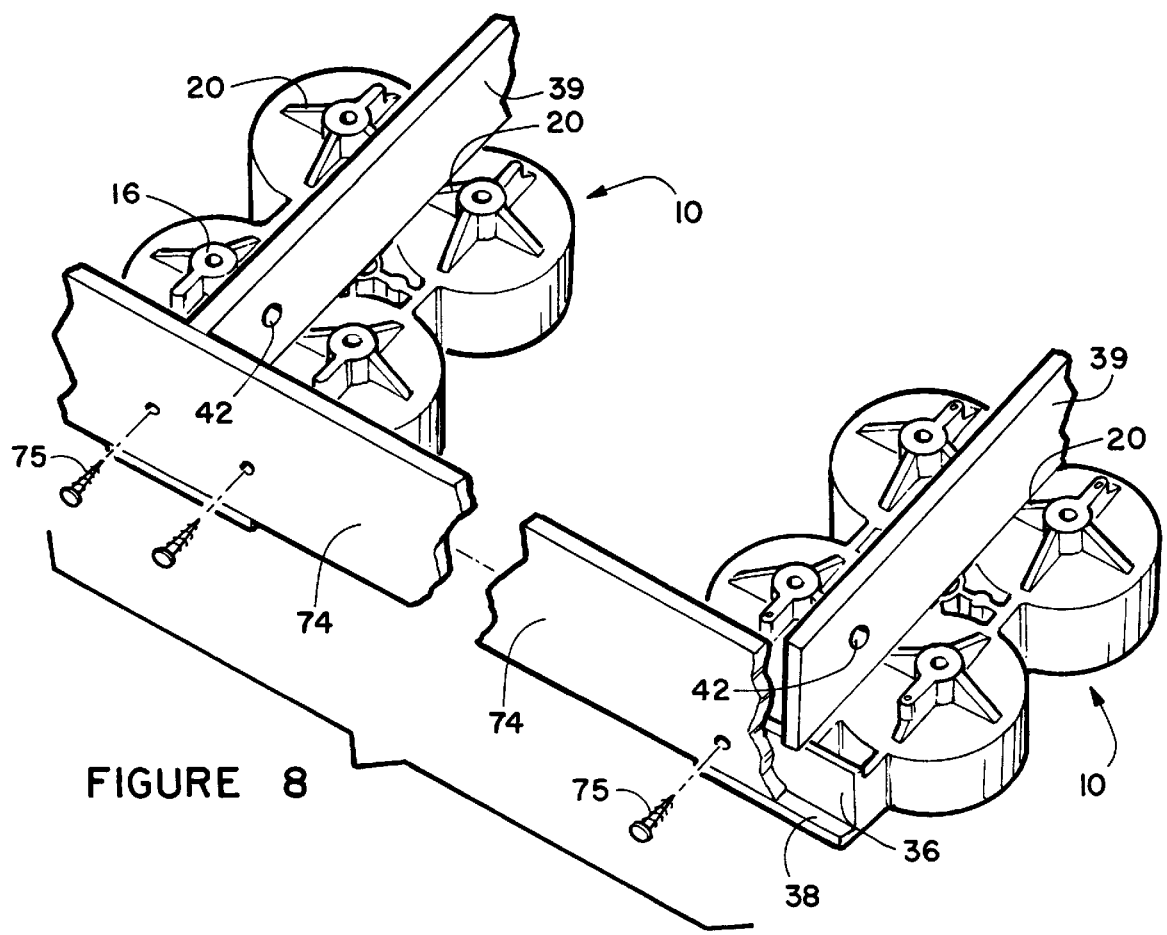
FIG. 8 is a detail view showing a gondola with an interconnecting beam between adjacent dollies.

FIG. 8 is a detail view, broken away to show detail, of tying adjacent dollies 10 together. A conventional board 74, such as a 1 by 4 or 1 by 6, or a steel bar can be positioned on ledges 38 and against wall 36 of two or more adjacent dollies 10 and the board fastened to wall 36 by conventional wood screws 75. Generally, holes need not be predrilled in walls 36. This tie system is effective with the display case directly mounted on the dollies as seen in FIG. 6. A board 74 supported or ledge 38 and fastened to wall 36 ties a series of dollies together along a quite long display case or cases to increase resistance to lateral loads as the entire assembly is being moved around.

Figure 9:
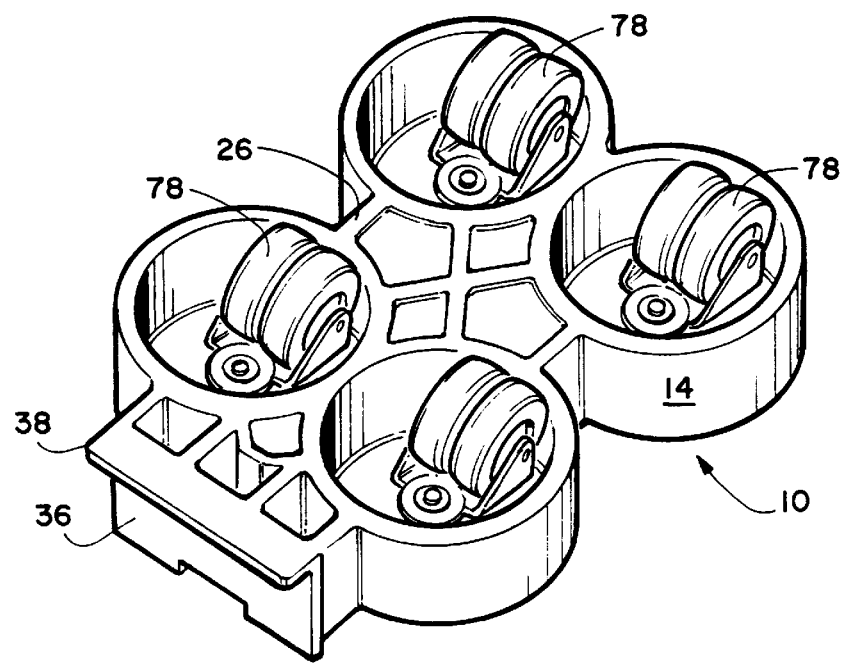
FIG. 9 is a perspective view of the underside of a dolly with dual-wheel casters.

Some display cases may be very heavy. Wheels 18 as seen in FIG. 2 are preferably made from a material having sufficient strength to carry the weight of a fully loaded display case, but sufficiently resilient to not mar the floor when a case is moved. Where the weight of the case exceeds the capacity of the single wheels shown in FIG. 2, rather than using a metal wheel, it is preferred to use a caster with a double wheel 78 as seen in FIG. 9. The casters can be easily changed between single and double casters in manufacturing or in the field.

Figure 10:
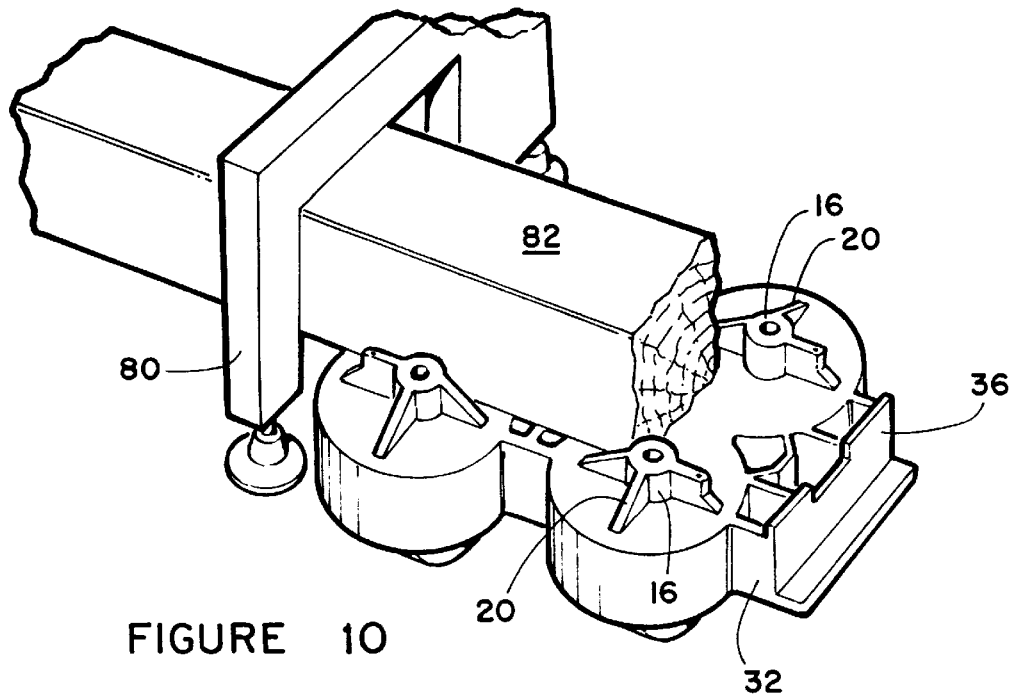
FIG. 10 is a perspective view of an alternate display support using a beam across plural dollies.

FIG. 10 illustrates the use of dollies 10 with a display case supported on generally U-shaped brackets 80. Webs 20 that extend toward each other can be eliminated, either in manufacture or by trimming in the field so that beam 82 fits between adjacent tubes 16. Depending on the width of beam 82, the beam may rest on the dolly perpendicular (as seen) or parallel to surface 36. The spacing between adjacent tubes 16 is different in each direction to accommodate two different beam widths.

Figure 11:
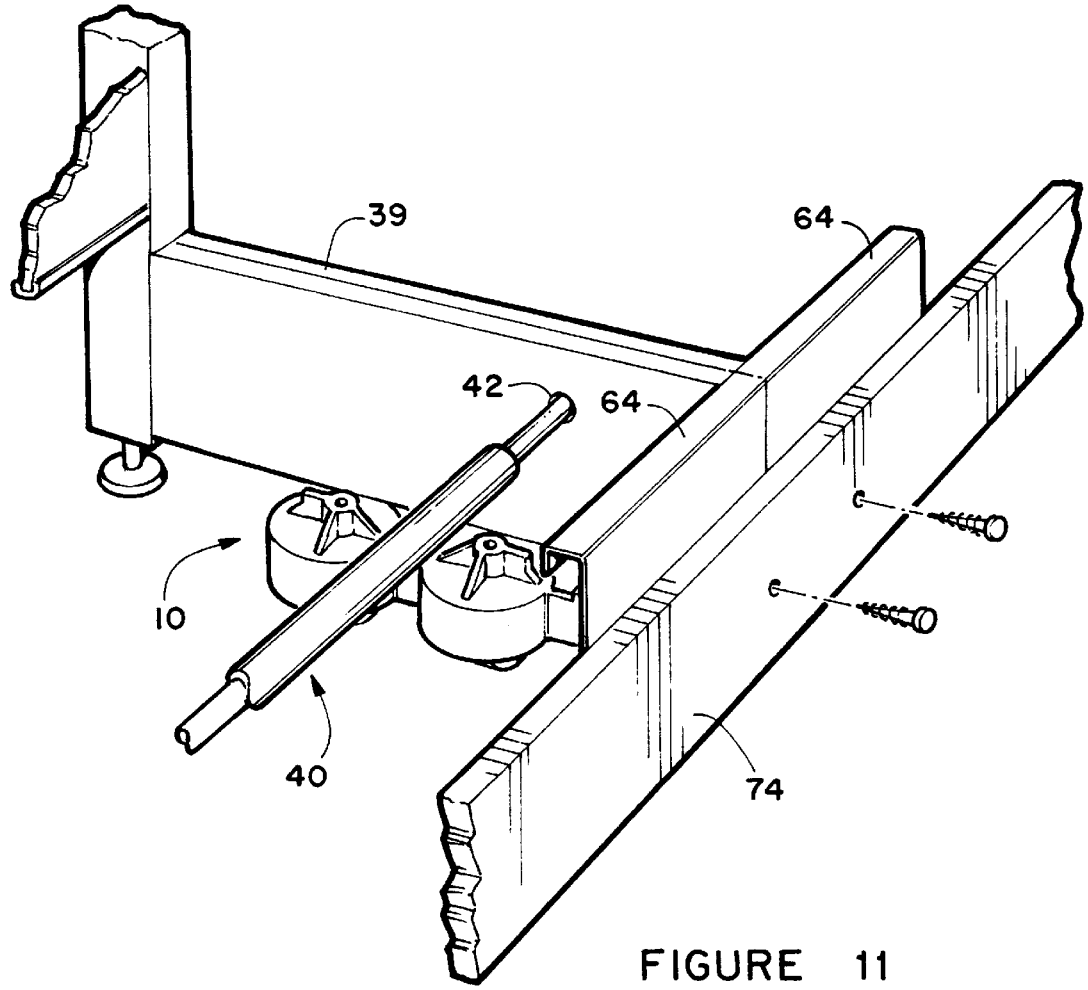
FIG. 11 is a perspective view of an embodiment having a board fastened to display kick plates and extending across plural dollies.

FIG. 11 illustrates the combination of dolly 10, a rail 39 resting on the dolly, kick plates 64 and a lift device 40 in place in holes 42. In this embodiment, a board 74 is fastened to kickplates 64 by screws 75 to maintain the entire display case assembly, with plural spaced dollies 10, in proper alignment during movement.

FIG. 12 schematically illustrates the understructure mounted on a plurality of dollies 10. A display case structural member 90 extends between plural spaced rails 39. Kickplates 64 extend along ends of rails 39. Lifting devices 40 are in place between adjacent pairs of rails 39. Conventional pallet jacks 92 are positioned with lifting bars 94 just under the lifting devices 40. The pallet jacks 92 are operated to uniformly engage and lift the display cases, then move the entire assembly to a selected location.

The dolly of this invention is versatile and usable with a variety of different types of display cases. If desired, proportions and arrangements of components of the dollies may be varied to accommodate other types of display cases.

While certain specific relationships, materials and other parameters have been detailed in the above description of preferred embodiments, those can be varied, where suitable, with similar results. Other applications, variation and ramifications of the present invention will occur to those skilled in the art upon reading the present disclosure. Those are intended to be included within the scope of this invention as defined in the appended claims.

We claim:

1. A dolly system for use in moving loaded display cases, which comprises:

means for lifting a structure to which dollies are to be secured;

at least one dolly having a housing having upper and lower surfaces;

a plurality of casters secured to said lower surface;

a plurality of cup-shaped walls secured to said housing and surrounding each said caster with said caster extending beyond said wall a predetermined distance;

rail engaging means on said housing upper surface for engaging and supporting a downwardly extending rail on a display case;

each said caster comprising at least one wheel, a bracket for supporting said wheel and a stem extending from said bracket;

said housing including a tubular member extending upwardly from said lower surface for receiving said stem for swiveling relative thereto; and said housing upper surface including a plurality of spaced webs for supporting said tubular member.

2. The dolly system according to claim 1 further including means on said housing for engaging an elongated board for securing said board to a plurality of spaced housings.

3. The dolly system according to claim 1 wherein four substantially equally spaced casters are mounted on said housing lower surface.

4. The dolly system according to claim 1 wherein said webs slope from said upwardly extending tubular member to said upper surface and said rail engaging means comprises a space between webs along said upper surface, whereby a rail moving toward said space will be guided by said webs into said space.

5. The dolly system according to claim 1 wherein said upper surface of said housing further includes means for fastening said housing to a sheet of material.

6. The dolly system according to claim 1 wherein said housing is formed from glass fiber filled acrylonitrile-butadiene-styrene plastic.

7. The dolly system according to claim 1 wherein each said dolly further includes means for supporting a kick plate secured to said rail and ridge means for engaging said kick plate for preventing sliding movement of said dolly along said rail.

8. A dolly system for use in moving loaded display cases, which comprises:

means for lifting a structure to which dollies are to be secured;

at least one dolly having a housing having upper and lower surfaces;

a plurality of casters secured to said lower surface;

a plurality of cup-shaped walls secured to said housing and surrounding each said caster with each said caster extending beyond said wall a predetermined distance;

linear rail engaging areas on said housing upper surface for engaging and supporting downwardly extending rails on a display case;

a plurality of tapered webs extending upwardly of said upper surface adjacent to said linear rail engaging areas for guiding said rails to said linear rail engaging areas as said rails are brought toward each said dolly;

kick plate engaging means on said housing upper surface for engaging and supporting a downwardly extending kick plate on a display case;

wherein said lifting means comprises a rod assembly for placement through holes in adjacent rails for engagement by a lifting apparatus; and said rod assembly comprises a tube having a first rod secured within a first end of said tube and a second rod axially slidable in a second end of said tube.

9. The dolly system according to claim 8 wherein four substantially equally spaced casters are mounted on said housing lower surface.

10. The dolly system according to claim 8 wherein each said caster comprises at least one wheel, a bracket for supporting said wheel and a stem extending from said bracket, said housing includes a tubular member extending upwardly from said lower surface for receiving said stem for swiveling relative thereto and said webs secured to and extending from said tubular member.

11. The dolly system according to claim 8 wherein said upper surface of said housing further includes means for fastening said housing to a sheet of material.

12. The dolly system according to claim 8 wherein said housing is formed from glass fiber filled acrylonitrile-butadiene-styrene plastic.

13. The dolly system according to claim 8 wherein said rod assembly comprises an elongated member having a channel cross section, a first rod secured within a first end of said member and having an end extending beyond said member, a tube secured to said channel member adjacent a second end of said member and a second rod slidably carried by said tube for extension beyond said second end of said member.

14. A dolly for supporting a structure during movement of said structure across a surface, which comprises:
   a housing having upper and lower surfaces;
   a plurality of spaced projections secured to said upper surface;
   a plurality of tapered webs extending between said projections and said upper surface;
   said upper surface between said projections configured for supportingly receiving a structure to be supported and moved;
   a plurality of spaced casters secured to said housing adjacent to said lower surface;
   a wall extending away from said lower surface adjacent to said casters for engaging an elongated member for connecting said dolly to other dollies.

15. The dolly according to claim 14, wherein at least some of said tapered webs extend from a projection toward an adjacent projection for receiving a downwardly extending rail on a structure to be supported.

16. The dolly according to claim 17, further including a ridge extending upwardly from said upper surface for engaging and retaining a kickplate secured to said rail against movement relative to said dolly.

17. The dolly according to claim 15, further including a ledge on said wall for engaging and retaining said elongated member in a predetermined position relative to said dolly.

18. The dolly according to claim 17, further including an opening in said upper surface for receiving a downwardly extending level adjustment means extending from said rail so that movement of said rail relative to said dolly is prevented.

19. The dolly according to claim 14, further including means for supporting a sheet of material in contact with said projections and for fastening said sheet of material to said dolly.

20. The dolly system according to claim 14 wherein four substantially equally spaced casters are mounted on said housing lower surface.

21. The dolly system according to claim 14 wherein each said caster comprises at least one wheel, a bracket for supporting said wheel and a stem extending from said bracket, said housing includes a tubular means extending upwardly from said lower surface for receiving said stem for swiveling relative thereto and said housing upper surface includes a plurality of spaced webs for supporting said tubular means.

22. A dolly system for use in moving loaded display cases, which comprises:
   means for lifting a structure to which dollies are to be secured;
   at least one dolly having a housing having upper and lower surfaces;
   a plurality of casters secured to said lower surface;
   a plurality of cup-shaped walls secured to said housing and surrounding each said caster with said caster extending beyond said wall a predetermined distance;
   rail engaging means on said housing upper surface for engaging and supporting a downwardly extending rail on a display case;
   said lifting means comprising a rod assembly for placement through holes in adjacent rails on a display case to be lifted; and
   said rod assembly comprises an elongated member having a channel cross section, a first rod secured within a first end of said member and having an end extending beyond said member, a tube secured to said channel member adjacent a second end of said member and a second rod slidably carried by said tube for extension beyond said second end of said member.

23. The dolly system according to claim 22 wherein each said dolly further includes an opening in said upper surface for receiving an end of a level adjustment bolt extending downwardly from a display case to prevent lateral relative movement between display case and dolly.

* * * * *